US006451475B1

(12) United States Patent
Sherwood

(10) Patent No.: US 6,451,475 B1
(45) Date of Patent: Sep. 17, 2002

(54) FRONT ACCESS INTERLOCKING MODULAR CELL TRAY ASSEMBLY

(75) Inventor: Mark R. Sherwood, Allentown, PA (US)

(73) Assignee: East Penn Manufacturing Company, Inc., Lyon Station, PA (US)

( * ) Notice: Subject to any disclaimer, the term of this patent is extended or adjusted under 35 U.S.C. 154(b) by 53 days.

(21) Appl. No.: 09/610,000

(22) Filed: Jul. 5, 2000

(51) Int. Cl.[7] ................................. H01M 2/02

(52) U.S. Cl. ........................ 429/100; 429/96

(58) Field of Search .................... 429/100, 96

(56) References Cited

U.S. PATENT DOCUMENTS

| | | | | |
|---|---|---|---|---|
| 5,304,434 A | * | 4/1994 | Stone | 429/100 |
| 5,403,679 A | * | 4/1995 | Stone | 429/100 |
| 5,736,272 A | * | 4/1998 | Veenstra et al. | 429/100 |
| 5,981,101 A | * | 11/1999 | Stone | 429/100 |
| 6,120,934 A | * | 9/2000 | Linning et al. | 429/100 |

* cited by examiner

*Primary Examiner*—Carol Chaney
(74) *Attorney, Agent, or Firm*—Zachary T. Wobensmith, III

(57) ABSTRACT

Front access interlocking modular cell tray assembly having a base and a plurality of stacked cell trays thereon, having battery cell receiving areas, and each cell tray having front and rear interlocking structure on the top and bottom to engage with complemental front and rear interlocking structure on the base and individual stacked cell trays.

2 Claims, 6 Drawing Sheets

FRONT ACCESS INTERLOCKING MODULAR CELL TRAY ASSEMBLY

BACKGROUND OF THE INVENTION

1. Field of the Invention

This invention relates to a modular cell tray assembly for lead-acid batteries, which assembly is of the front access interlock type.

2. Description of the Prior Art

In the prior art, it has been known to provide modular cell tray assemblies, which contain a plurality of cells, which are connected together to form batteries for use as stand by, or uninterruptable power supplies, for use by computer systems, or for other applications where uninterruptable power supplies are required. Such systems typically use a plurality of sealed lead-acid cells, which cells are connected together in series, or parallel, to form batteries, which provide the power source.

Lead-acid cells are the cells of choice, and are heavy, with a typical weight range of 20 to 210 pounds. The quantity of cells required for an installation may be 12 to 240 cells, which requires a heavy-duty storage facility. The nature of the power system requirements is such that the systems, which are used in industries such as the communications industry, are required to be capable of withstanding high seismic conditions of the type experienced in zone 4 applications.

In addition the systems must be capable of frontal access for changing power requirements, and repair or replacement of cells, with the systems often in locations where access to the rear of the systems may be difficult, or dangerous.

Various modular cell tray assemblies have been proposed such as that shown in the U.S. Patents to Schaffer et al U.S. Pat. No. 5,227,266, Stone U.S. Pat. No. 5,304,434 and Stone U.S. Pat. No. 5,980,101 which systems may suffer from various undesirable features.

The front access interlock modular cell tray assembly of the invention provides for safe securement of the individual cells, while providing improved accessibility and securement of the cell trays, and is suitable for zone 4 applications.

SUMMARY OF THE INVENTION

A front access interlocking modular cell tray assembly, which has a plurality of cell trays, which are stacked one upon the other, and interlocked at the front and back by a wedged construction, with cell receiving areas to receive a plurality of individual cells, which cells are connected together to form batteries to provide a power supply. The individual cell trays include a bottom wall, a top wall, and side walls connecting the top and bottom walls, with front and rear interlocking structure provided on both the top and bottom walls, whereby the individual cell trays can be locked together to form the system, and unlocked for repair or replacement without requiring access to the rear of the trays.

The principal object of the invention is to provide a front access interlocking modular cell tray assembly.

A further object of the invention is to provide a cell tray assembly which meets the sesmic requirements for zone 4 applications.

A further object of the invention is to provide a cell tray assembly that provides easy access for servicing and replacement.

A further object of the invention is to provide a cell tray assembly that is simple and inexpensive to construct but sturdy and reliable in use.

A further object of the invention is to provide a cell tray assembly that can be used with a variety of end uses.

A further object of the invention is to provide a cell tray assembly that requires a minimum of space.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should of course be understood that the description and drawings herein are merely illustrative, and that various modifications and changes can be made in the methods, structures, and embodiments disclosed without departing from the spirit of the invention.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents, which operate and function in substantially the same way to bring about the same result.

Figure 1:
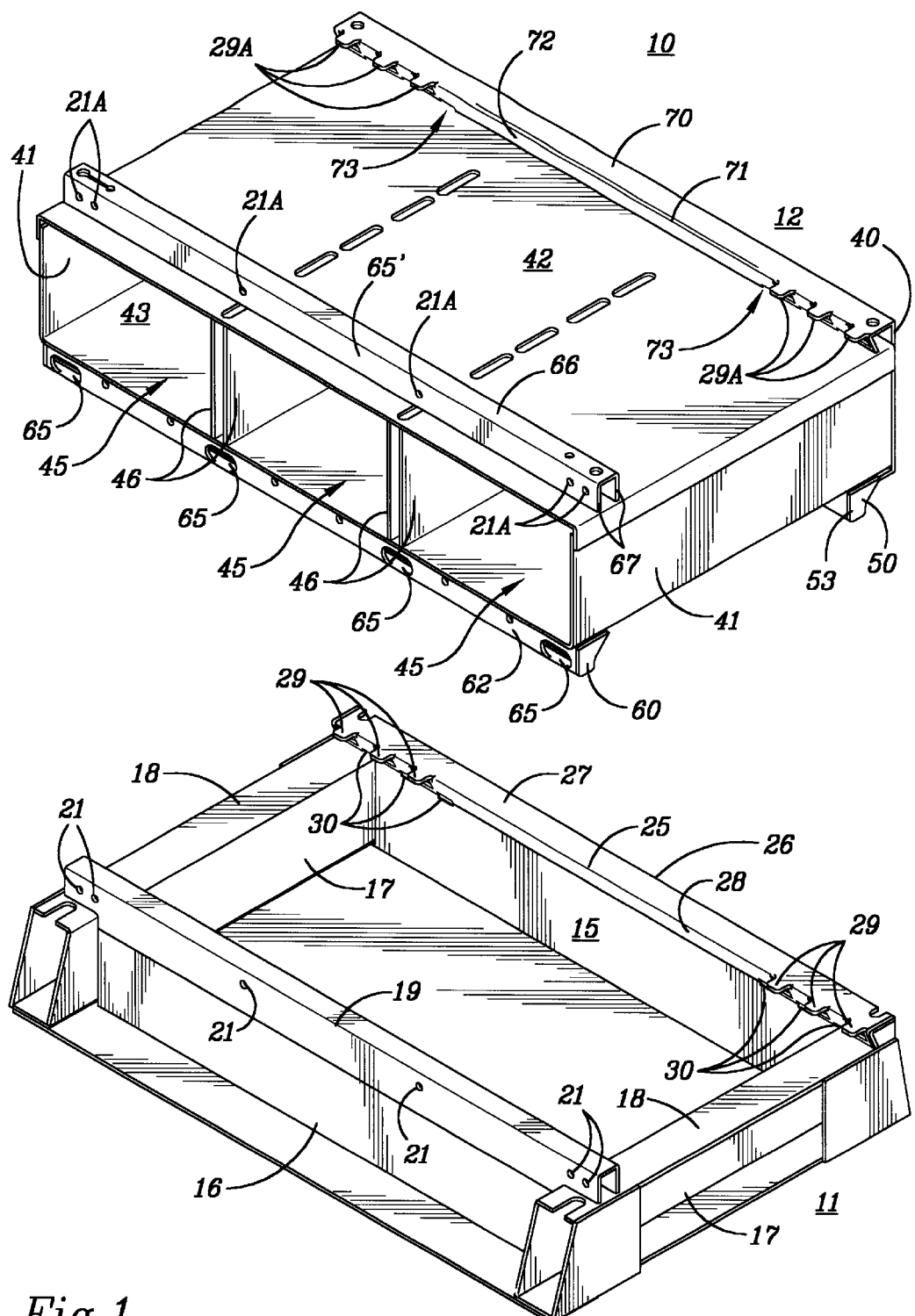
FIG. 1 is a front exploded perspective view of the wedge interlocked modular cell tray assembly of the invention with a single cell tray.
Figure 2:
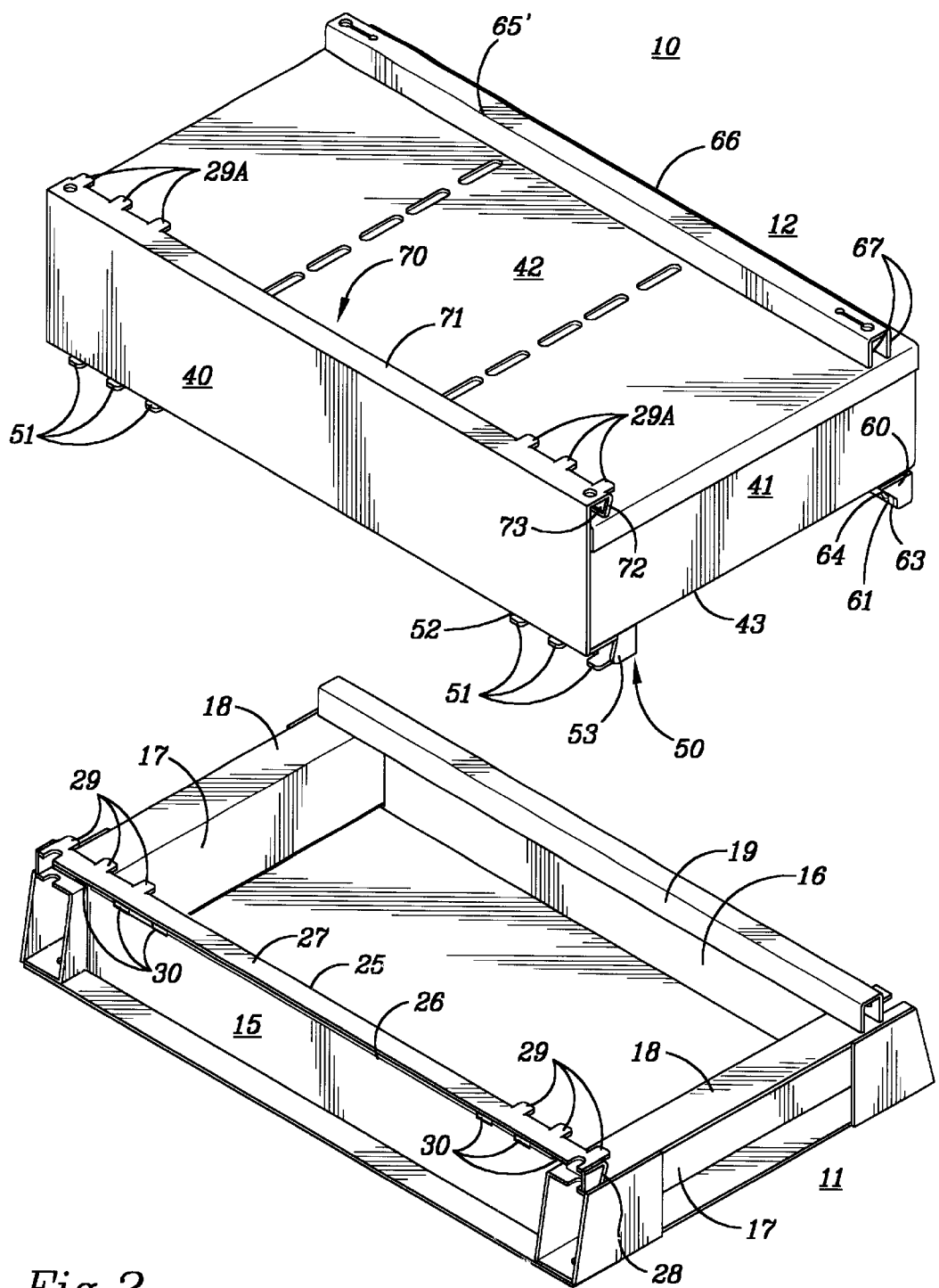
FIG. 2 is a view similar to FIG. 1, but taken from the rear of the assembly.
Figure 3:
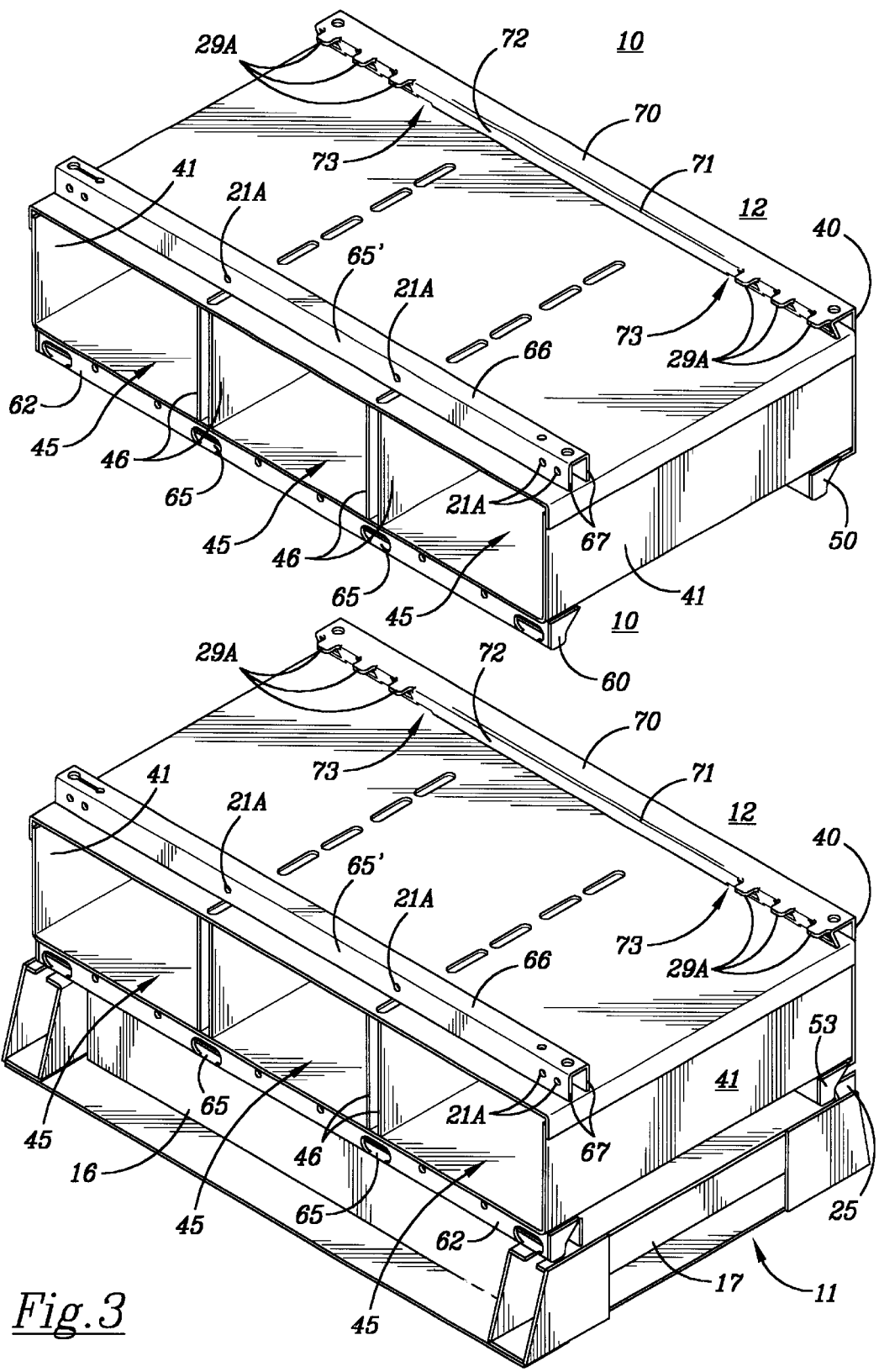
FIG. 3 is a front partially exploded perspective view, illustrating the assembly with two cell trays.
Figure 4:
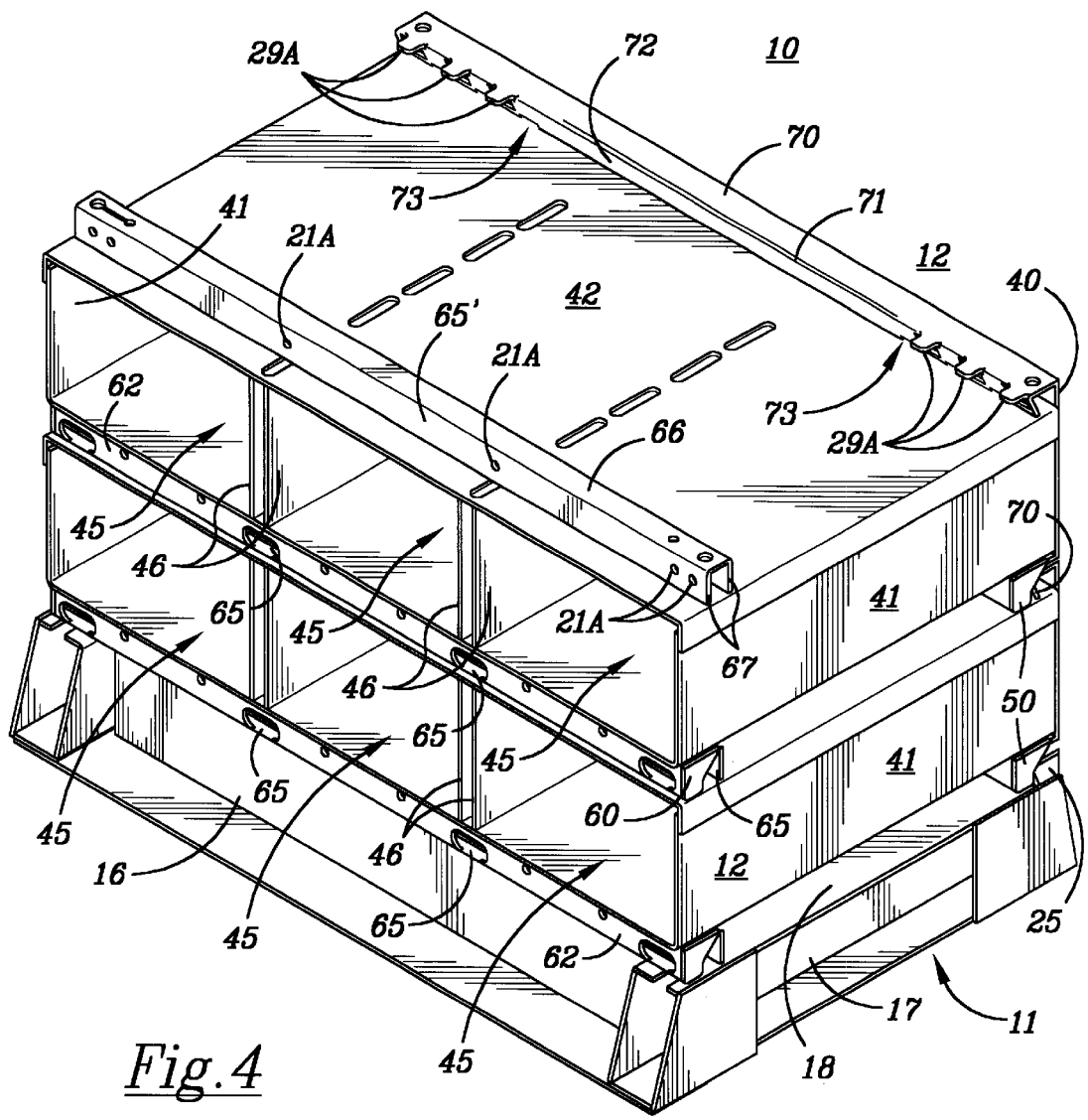
FIG. 4 is a front perspective view of the cell tray assembly in assembled condition.
Figure 5:
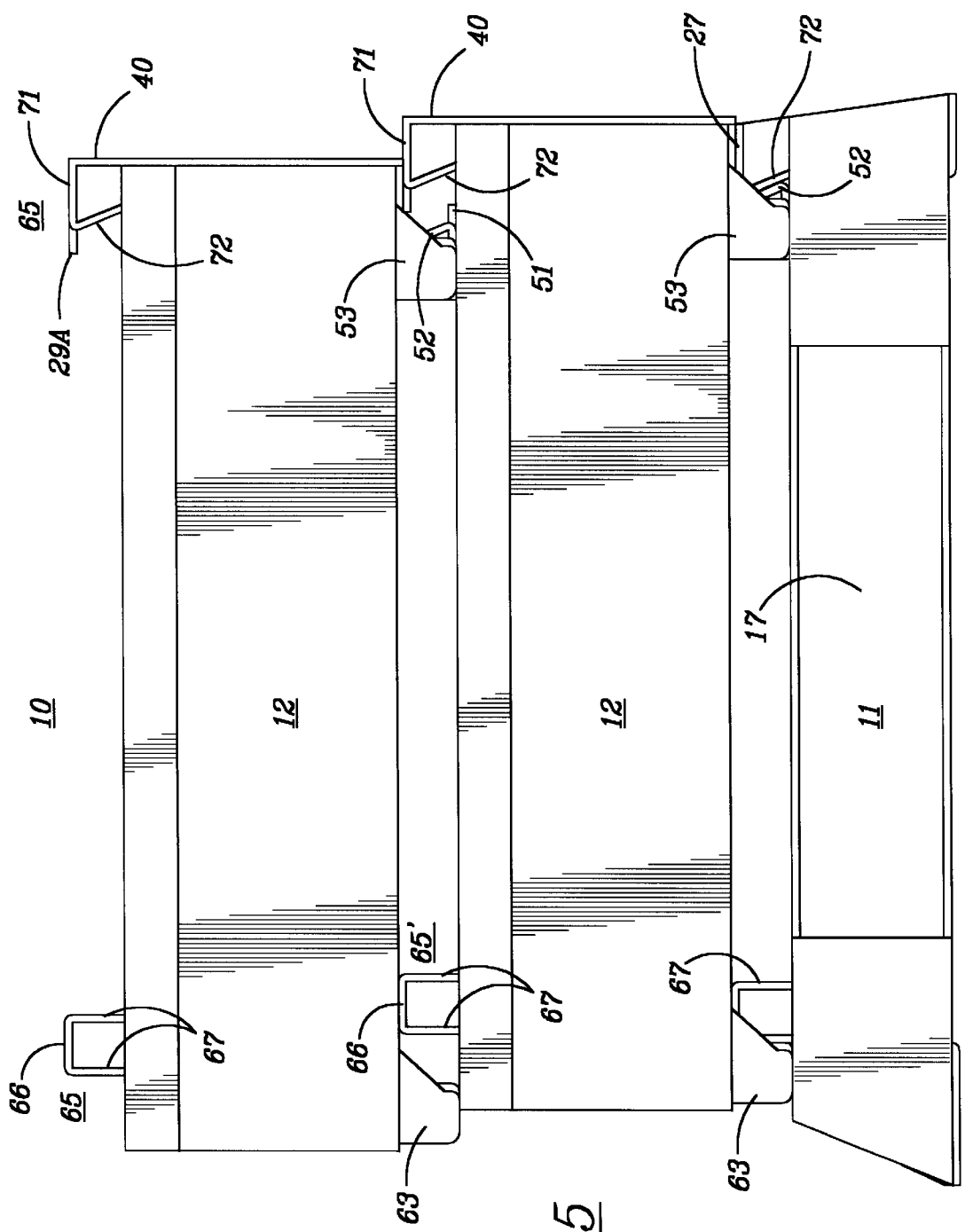
FIG. 5 is a right side elevational view of the assembly, illustrating assembly of cell trays.
Figure 6:
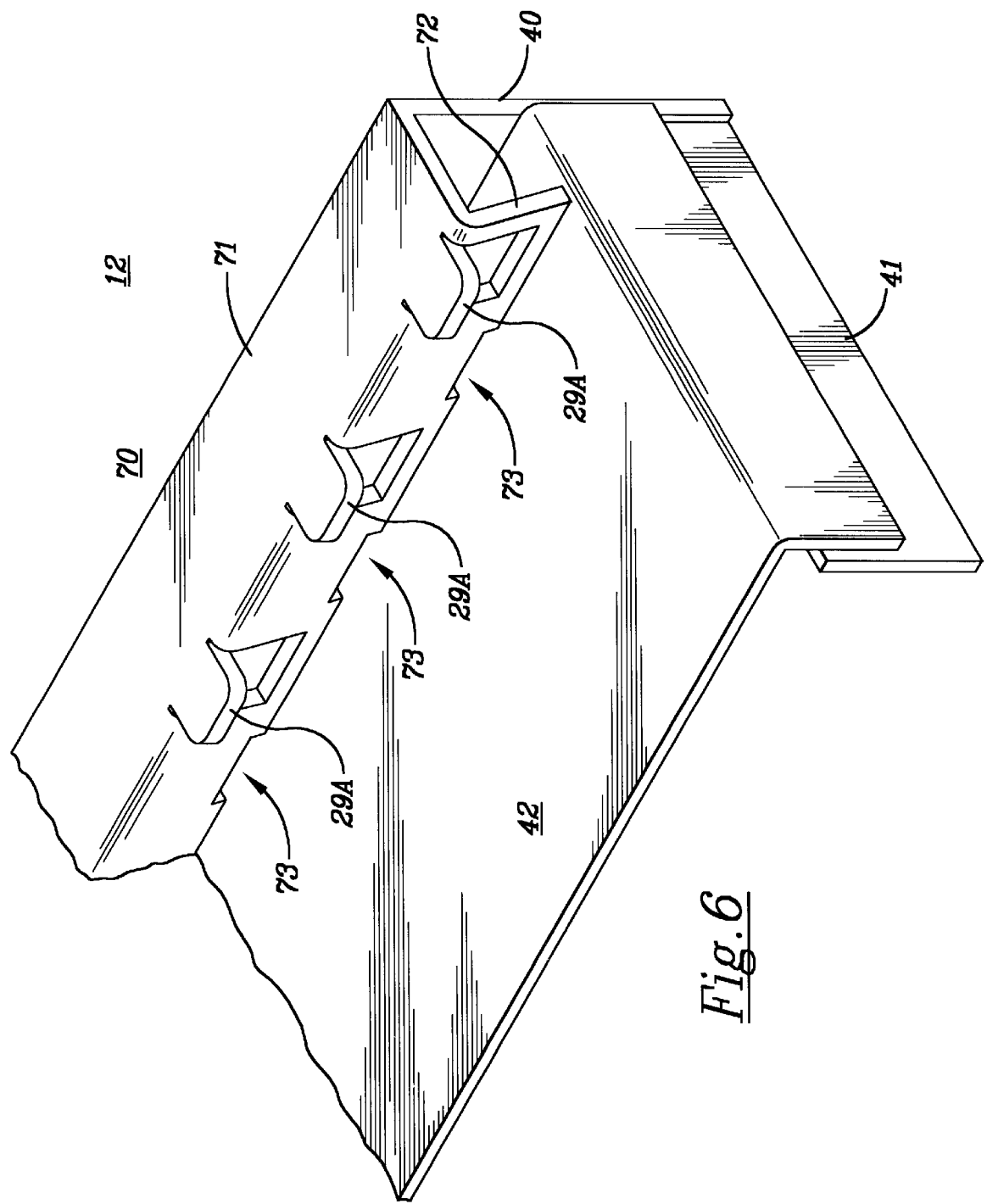
FIG. 6 is a fragmentary perspective view, enlarged, illustrating a portion of the rear interlocking structure.

Preferring now more particularly to the drawings and FIGS. 1–5, the modular cell tray assembly 10 is illustrated therein. The assembly 10 includes a base 11, and a plurality of individual cell trays 12, one of which is placed on the base 10, and the rest of which are stacked and secured together to be described.

The base 11 and cell trays 12 are preferably formed of stamped and welded steel plate.

The base 11 is of rectangular configuration, with a rear wall 15, front wall 16, and side walls 17 connecting the front and rear walls. The side walls 17 have top plates 18 extending therealong, with a set back front interlock structure 19 connected thereto, which is a "U" shaped open channel which channel 19 has a plurality of openings 21 therein six being illustrated, with captive nuts adjacent thereto (not shown) inside channel 19.

The rear wall 15 has a rear interlocking structure 25, which is also connected to top plates 18. The rear interlocking structure 25 is a "U" shaped open channel with a vertical rear wall 26, a top wall 27, and a forwardly inclined front wall 28. The top wall 27 has a plurality of spaced tabs 29, six being illustrated, which extend forwardly from top wall 27. The front wall 28 has a plurality of slots 30 spaced between the tabs 29.

The cell trays 12 are of overall rectangular configuration, with vertical rear walls 40, side walls 41 connected thereto, top walls 42 connecting the rear and side walls, and bottom walls 43 connecting the rear and side walls. The cell trays 12 are open at the front, and divided into cell receiving areas 45, by vertical partition walls 46, three being illustrated which are fastened to the top walls 42 and bottom walls 43.

The cell trays 12 are provided with well known retaining structure (not shown) to retain the cells (not shown) in the cell receiving areas 45.

The bottom walls 43 are provided with rear interlocking structure 50, which include a plurality of spaced, rearwardly extending tabs 51, which are intended to extend into slots 30. The structure 50 has a rearwardly inclined wall 52 with slots (not shown), for insertion of tabs 29, which wall 52 is at a complimentary angle to front wall 28, and upon insertion of tabs 51 into slots 30, and tabs 29 into slots (not shown) will contact front wall 28 and prevent vertical movement therebetween. The structure 50 also includes plates 53 at each end, which extend over the ends of rear structure 25.

The bottom walls 43 are also provided with front interlocking structures 60, which include rear walls 61, front walls 62 and bottom walls 63. The rear walls 61 are intended to engage channels 19, and have a plurality of openings 64 to receive bolts (not shown) which are intended to engage in openings 21 and nuts (not shown) to retain the tray 12 to the base 11. The front walls 62 have openings 65 for access to the openings 64.

The top walls 42 have a front interlocking structure 65, which is similar to front structure 19, of "U" shaped configuration in cross section, and intended to be engaged by front interlocking structure 60 as described above. The front structure 65 has a top wall 66, and straight vertical side walls 67 connected thereto, and also to top walls 42.

A plurality of openings 21A are provided in front side wall 67, with captive nuts (not shown) inside, and adjacent to openings 21A to receive bolts (not shown) as described above.

The top walls 42 have rear interlocking structure 70 which includes a top wall 71 connected to rear wall 40 of cell 12, with tabs 29A extending forwardly for engagement in slots (not shown) in wall 52.

The structure 70 includes a forwardly extending inclined wall 72 connected to top wall 71, and top wall 42 with a plurality of slots 73 therein to receive tabs 51 from rear interlocking structure 50.

It will thus be seen that the objects of the invention have been achieved.

I claim:

1. An interlocking modular cell tray assembly with front access to said modular cell tray assembly, which comprises,
   a base,
   said base having front and rear interlocking structure means,
   at least one stackable cell tray for assembly onto said base,
   said cell tray having top and bottom walls, and side walls connecting said top and bottom walls,
   cell receiving areas in said cell tray to receive battery cells,
   cell retaining means to retain said battery cells in said areas,
   self interlocking rear interlocking structure means on said cell tray bottom wall for engagement with said base rear interlocking structure means,
   said base rear interlocking structure means includes a rear wall, a top wall connected to said rear wall, a rearwardly inclined front wall, a plurality of tabs extending from said top wall, and a plurality of slots in said front wall,
   said rear interlocking structure means on said cell tray bottom wall includes a front wall, a bottom wall connected to said front wall, a rearwardly inclined rear wall connected to bottom wall, a plurality of slots in said rearwardly inclined wall to receive said tabs from said cell tray bottom wall rear interlocking structure means and,
   a plurality of tabs extending from said cell tray rear interlocking structure means to engage in said slots in said base rearwardly inclined wall,
   whereby upon contact, said forwardly and rearwardly inclined walls provide a wedged rear interlock,
   front interlocking structure means on said cell tray bottom wall for engagement with said base front interlocking structure means,
   said base front interlocking structure means includes a "U" shaped channel,
   a plurality of openings in said channel,
   a plurality of captive nuts on said channel adjacent said openings,
   said cell tray front interlocking structure means on said cell tray bottom wall includes a front wall, a bottom wall and a rear wall intended to engage said U-shaped channel having openings therein,
   bolts to be inserted into said cell tray rear wall openings and
   said channels to retain them together,
   said cell tray top walls including front interlocking structure means which includes a second U-shaped channel,
   a plurality of openings in said channel,
   a plurality of captive nuts on said channel adjacent said openings,
   said cell tray side walls having a plurality of openings, and
   bolts inserted into said openings and said captive nuts on said second U-shaped channel to cause said front tray and said front base interlocking structures to contact, thereby wedging together said base and said cell tray front interlocking structures.

2. An interlocking modular cell tray assembly as defined in claim 1 which said cell tray top wall has rear interlocking structure means for engagement with rear interlocking structure means on a cell tray bottom wall of a second cell tray stacked thereon, and,
   said first cell tray top wall has front interlocking structure means for engagement with front interlocking structure means on the bottom wall of said second stacked cell tray.

* * * * *